United States Patent [19]

Smith

[11] 4,352,152
[45] Sep. 28, 1982

[54] HIGH SPEED NON-SATURATING INVERTER

[75] Inventor: Stephen H. Smith, Playa del Rey, Calif.

[73] Assignee: Hybricon Inc., North Hollywood, Calif.

[21] Appl. No.: 111,259

[22] Filed: Jan. 11, 1980

[51] Int. Cl.³ .................................... H02M 1/12
[52] U.S. Cl. .................................. 363/41; 318/811
[58] Field of Search .................. 307/265; 318/811; 363/26, 41, 56

[56] References Cited

U.S. PATENT DOCUMENTS

| | | | |
|---|---|---|---|
| 3,319,151 | 5/1967 | Kanngiesser | 363/41 X |
| 3,740,588 | 6/1973 | Stratton et al. | 307/265 X |
| 3,859,583 | 1/1975 | Reed | 363/26 |
| 3,906,247 | 9/1975 | Heffner | 307/265 X |
| 4,196,320 | 4/1980 | Townsend | 363/26 X |
| 4,204,266 | 5/1980 | Kammiller et al. | 363/26 X |

Primary Examiner—William M. Shoop

Attorney, Agent, or Firm—Lyon & Lyon

[57] ABSTRACT

Method and apparatus are disclosed herein for controlling the voltage supplied to a motor to vary the speed thereof. A pulsewidth modulator is supplied a sawtooth waveform from a waveform generator and is controlled by an input signal to provide a variable duty cycle pulse train. The waveform generator also provides a start pulse which triggers an output driver circuit. The output driver circuit provides base current to a plurality of paralleled output transistor stages, which may be Darlington pairs, connected to the motor. The collector voltage of the output stages is monitored and, if it drops below a predetermined threshold at the edge of saturation, is clamped to a voltage and the edge of saturation, thereby preventing the output transistors from operating in saturation while at the same time minimizing the voltage across the collector of the output stages. This arrangement eliminates the need for emitter resistors while at the same time providing for high speed operation and better load sharing among the paralleled output transistors.

17 Claims, 2 Drawing Figures

HIGH SPEED NON-SATURATING INVERTER

RELATED APPLICATIONS

This application is related to the application of Stephen H. Smith, Ser. No. 111,261 and entitled Improved Coulometer and the application of Robert G. Metzner and Stephen H. Smith, Ser. No. 111,260 entitled Hybrid Electric Vehicle Control Methods and Devices, both filed concurrently herewith.

FIELD OF THE INVENTION

The present invention relates generally to motor controllers, and more particularly to variable voltage speed controls.

BACKGROUND OF THE INVENTION

It has long been known to control motors, and particularly DC motors, by varying the applied voltage. Various approaches to such voltage variation have been employed, including variable resistances, SCR controls, and numerous other configurations. Other approaches have been to supply with motor with sawtooth, square or other variable waveforms, such that the total power supplied to the motor can be controlled either by the ramp of the sawtooth, the duty cycle of the square wave, or other variations.

In those instances where square waves have been employed, it has been known to employ an inverter to convert a DC control signal to a variable duty cycle pulse train. Such inverters typically employ a bistable multivibrator to generate a pulse train, which creates difficulties in that the maximum duty cycle of such circuits is less than 100 percent, and also tends to drift. In addition, most if not all of such inverters have employed an output stage which operates at least a portion of the time in saturation to minimize voltage across the output transistors at high currents. Such devices have typically also employed emitter resistors to indicate the condition of the output transistors, which can create difficulties when paralleled devices are not perfectly matched or become slightly mismatched through thermal cycling or other effects.

In addition, while inverters operating in saturation are acceptable for relatively low speed operation, the maximum frequency of operation is limited by the time required for the charge stored in the saturated devices to be removed. While such low speed operation is acceptable for certain applications, there are many applications where relatively high frequency is either desirable or required. For example, ultrasonic operation is particularly useful where the device is to be operated around humans, since relatively low frequency operation is audible and annoying. In addition, in applications such as electric vehicles, higher frequency operation provides smoother performance.

SUMMARY OF THE INVENTION

The present invention alleviates or substantially eliminates many of the limitations found in prior art devices such that relatively high frequency operation may be permitted, while at the same time allowing large magnitudes of current to be supplied to the motor windings.

More particularly, the present invention includes a sawtooth generator which supplies a sawtooth voltage waveform to a pulsewidth modulator and a current limit circuit, and also supplies a start pulse to the remainder of the circuit. The pulsewidth modulator converts the sawtooth waveform into a train of rectangular pulses and also responds to a control signal to vary the pulsewidth of the output pulses. The pulsewidth modulator employs a comparator having a small amount of positive feedback to provide a duty cycle which can be varied over the entire range of zero to one hundred percent.

The output of the modulator is logically combined with a signal from a current limit circuit and serves as the input to an output driver circuit. The output driver circuit, which includes a switchable current source, provides base current to a plurality of output transistor stages, which in turn drive the windings of the motor. The output driver circuitry is turned on and off in accordance with the duty cycle defined by the pulsewidth modulator, and correspondingly turns on and off the output transistors which supply power to the motors.

An important feature of the present invention is that each of the output transistor stages is operated in the active range, and the collector voltage of the output stages is employed to indicate the condition of the output circuit. In the event collector voltage of the output stages drops to a level slightly above saturation of the output stages, the current limit circuit noted above clamps the collectors of the output stages to a level slightly above saturation. This permits high speed operation, since minimal charge storage exists in the transistors. In addition, when the current limit circuit controls the operation of the output stages, a signal is supplied from the sawtooth generator to the current limit circuit to cause the current limit level to be tapered according to the duty cycle, and also to synchronize the current limit circuit with the clock included in the sawtooth generator.

It is therefore one object of the present invention to provide an improved inverter.

It is another object of the present invention to provide an inverter capable of high speed operation with high operating currents.

It is another object of the present invention to provide an inverter whose output stage operates in the linear range with high operating currents.

It is another object of the present invention to provide a pulsewidth modulator capable of providing a duty cycle which is variable between zero and one hundred percent, or DC.

These and other objects of the present invention will be better understood from the following detailed description of one embodiment of the invention wherein FIGS. 1a and 1b are schematic diagrams of an embodiment of the invention.

DETAILED DESCRIPTION OF THE INVENTION

Figure 1A:
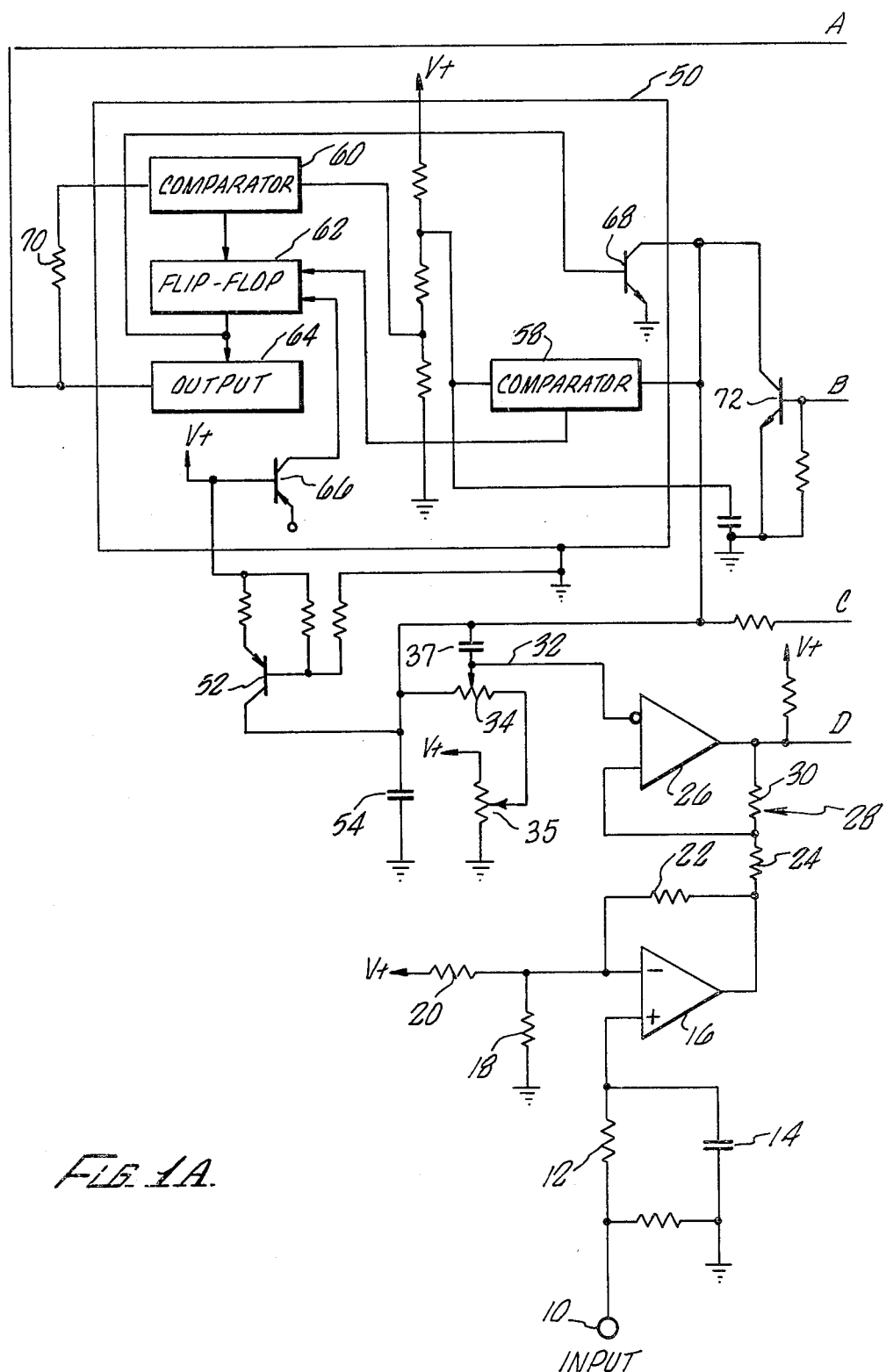
FIGS. 1A and 1B illustrate an embodiment of the present invention for use in controlling an electric motor of the type used to drive an electric vehicle.
Figure 1B:
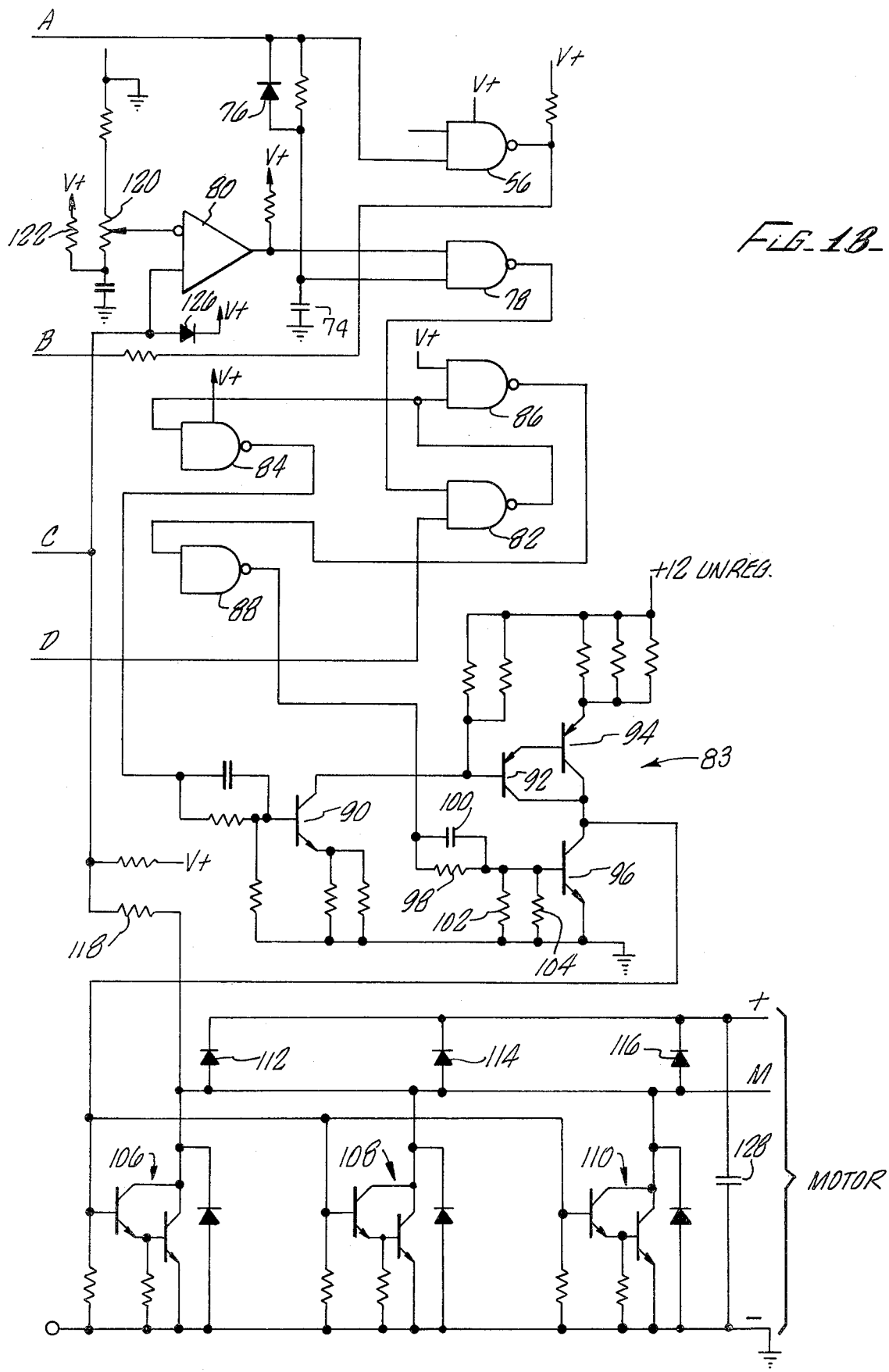

Reference is first made to FIGS. 1A and 1B, which illustrates an embodiment of the present invention suitable for use in controlling an electric motor of the type used to drive an electric vehicle. However, the present invention has application greatly beyond this specific example, and is not to be limited to the embodiment disclosed herein. An input signal 10 is provided, through suitable input buffering comprising a resistor 12 and parallel capacitor 14, to the noninverting input of an amplifier 16. The inverting input of the amplifier 16 is provided from a voltage divider comprising resistors 18 and 20, the remaining terminals thereof being tied to ground and a reference voltage, respectively.

A feedback resistor 22 is connected between the output of the amplifier 16 and the negative input thereto. The input signal 10, for the particular configuration described herein, is preferably a DC voltage varying between three volts and 6.5 volts which, as will become clear hereinafter, causes the duty cycle of the present invention to vary between zero and one hundred percent. A minimum operating voltage, such as three volts, is useful for purposes of noise immunity, but is not essential in many applications.

The output of the amplifier 16 provides, through a resistor 24, the noninverting input to an amplifier 26 which together form a pulsewidth modulator, indicated generally as 28. The amplifier 26 is preferably a high slew rate comparator such as the LM339 manufactured by National Semiconductor. A feedback resistor 30 is connected between the output of the amplifier 26 and the noninverting input thereof, thus providing a small amount, for example fifty millivolts, of positive feedback. The positive feedback provides good noise rejection while at the same time establishing a minimum pulse width for the output of the modulator 28, which is of a duration insufficient to turn on the remaining circuity.

The inverting input to the amplifier is provided from the slide arm 32 of a variable resistor 34 which forms part of a sawtooth generator circuit described below. The resistor 34, together with another variable resistor 35 and a capacitor 37, provide compensation for nonlinearities in the load of the circuit, particularly motor brushes, commutating diodes and magnetic saturation. Thus the output of the pulsewidth modulator 28, which is taken from the output of the amplifier 26, is limited by the positive voltage supply to the amplifier 26, and is a positive, rectangular pulse which matches the frequency of the modified sawtooth waveform supplied to the inverting input. The pulsewidth of the output of the amplifier 26 is determined by the time the sawtooth voltage is less than the control signal on the noninverting input to the amplifier 26, which is determined by the signal supplied to the input 10. Thus the pulsewidth of the modulator output varies in accordance with the signal supplied to the input 10.

The signal supplied to the inverting input of the amplifier 26, which may be regarded as a sawtooth waveform, is generated by a timer indicated generally as 50, which may for example be a type LM555 timer, together with a transistor 52, storage capacitor 54 and Schmitt trigger inverter 56, as well as other circuitry described hereinafter. The timer 50, which includes comparators 58 and 60, a flip-flop 62 and an output buffer 64, together with transistor drivers 66 and 68, generates a triangular waveform at its output 64, the rise time of which is determined by the capacitor 54 as charged through a constant current source including the transistor 52 and associated biasing resistors. When the triangular waveform reaches its peak, the timer 50 is reset due to a connection, through a resistor 70, to the input of the comparator 60. Thus the triangular waveform is converted to a sawtooth waveform.

The output of the buffer 64 is supplied as the only input to the Schmitt trigger inverter 56. The Schmitt trigger inverter 56 supplies a pulse, which may for example be a 0.5 microsecond pulse, to a transistor 72. This causes the transistor 72 to saturate, thereby discharging the capacitor 54. This in turn resets the sawtooth generator for the next cycle. It can be seen that the pulse out of the inverter 56 defines the fall time of the sawtooth waveform.

At the same time that the timer output 64 supplies its signal to the invertor 56, the timer output also discharges through a capacitor 74 through a diode 76, thereby supplying a pulse to one input of another Schmitt trigger inverter 78. For the exemplary components described herein, the width of the pulse supplied to the inverter 78 is determined by the output resistance of the timer 50 and the value of the capacitor 74; a pulsewidth on the order of 5–7 microseconds has been found acceptable for applications involving control of motors for electric vehicles, although other values may be preferable for other applications. The remaining input to the inverter 78 is supplied from a current limit comparator 80, the function of which is to prevent the output transistors of the device from operating in saturation, as described in detail hereinafter.

When the inverter 78 is triggered, a pulse is supplied to one input of a third Schmitt trigger inverter 82, where it is NANDed with the output of the pulsewidth modulator 28. This causes a signal to be provided to an output driver circuit, indicated generally at 83, through Schmitt trigger inverters 84, 86 and 88. The output driver circuit 83 generally comprises a constant voltage source, which includes a transistor 90 and associated biasing components, together with a constant current source comprising transistors 92 and 94 and their associated biasing components. In addition, the output driver circuit 84 includes a switching transistor 96, the collector of which is connected to the collectors of the transistors 92 and 94 and the emitter of which is coupled to ground. The base of the transistor 90 is controlled by the constant voltage output of the inverter 84, and the collector of the transistor 90 controls the base of the PNP transistor 92.

The base of the transistor 96 is controlled by the inverter 88 through a turn-off circuit comprising a parallel connection of a resistor 98 and a capacitor 100 connected in series between the output of the inverter 88 and the base of the transistor 96, and also including a pair of resistors 102 and 104 connected between the base of the transistor 96 and ground. The transistor 96 is preferably, for the application here described, a large geometry, low resistance device (for example a type TIP 35C), and serves as a current switch between the current source transistors 92 and 94 and output transistors 106, 108 and 110. The transistor 94 is also preferably of large geometry; and may for example be a type TIP 36C.

As those skilled in the art will appreciate, constant current sources have relatively slow turn-on times, whereas it is advantageous to abruptly supply current to the output transistors 106, 108 and 110. Thus the transistor 96 is turned on when the inverter 88 initially receives a signal, and remains on while the current source transistors 92 and 94 reach a stable "on" state. At that point, the turn-off circuit including the capacitor 100 causes the transistor 96 to turn off, thereby switching the current provided by the transistor 94 to the base of the output transistors 106, 108 and 110. For the embodiment shown herein, a delay of approximately 300 nanoseconds before turning off the transistor 96 is suitable.

Switching off the transistor 96 causes each of the output transistors 106, 108 and 110, which are connected in parallel, to be driven into the active region. The transistors 106, 108 and 110 are preferably Darlington pairs, such as the RSD700 series previously manufactured by McCulloch Semiconductors and for which a specification sheet is attached. The transistor stages 106, 108 and 110 are characterized by fast switching times at high current; for example, 40 nanoseconds turn-on time and 60 nanoseconds turn-off time at 200 amperes with $V_{cesat}$ on the order of 1.05 volts at approximately 700 milliamperes base drive to the input stage of the Darlington pair. However, any fast switching transistor is acceptable for most applications, and such transistors can be paralleled for high current demand. Connected in series with the ganged collectors are three diodes 112, 114 and 116, which are preferably high current fast recovery devices such as SEMTEC type SCSF4, 180 amperes, $t_{rr}=200$ nsec. The load, or motor, is connected between the collectors of the output transistors 106, 108, 110 and the cathode of the diodes 112, 114 and 116, or the positive output terminal of the device. Thus, the diodes 112, 114 and 116 maintain a path for the motor current during the nonconductive intervals of the output transistors; since the switching rate of the modulator 28 is approximately twenty-five kilohertz for the embodiment disclosed herein, these paths are interrupted approximately 25,000 times per second.

Of particular note is that no emitter resistors are employed in connection with the output transistors 106, 108 and 110, and the emitters of each device are connected directly to ground. This permits each transistor to assume as much load as it can carry without failure, and thus makes allowance for different characteristics between transistors of the same type. Although it is preferable to have transistors of the same type, with the present configuration such matching is not in all instances necessary.

Also of importance in the present invention is the fact that the output stages of the Darlington pair output transistors 106, 108 and 110 are not operated in saturation, thus minimizing storage time and permitting operation at high frequencies. The input transistors of the Darlington pairs are operated in saturation to keep the voltage across the collector of the output transistor as low as possible. To ensure that the output stages of the output transistors 106, 108 and 110 do not enter saturation, the current limit comparator 80 is provided. The collectors of the transistors 106, 108 and 110 are each connected to the noninverting input of the comparator 80 through a resistor 118. In the event the collector voltage of the output transistors (which is used as the indicator of output conditions) drops to nearly the saturation voltage of the particular output transistors, the collector voltage is clamped through the comparator 80 to the value established as a reference by a variable resistor 120, the slide arm of which provides the inverting input to the comparator 80. The remote terminal of the resistor 120 may be connected to a reference voltage, such as five volts, through another resistor 122.

When the collector voltage seen at the input to the comparator 80 reaches the reference voltage, which may for example be 1.05 volts for the output transistors described here, the output of the comparator 80 becomes active and controls the inverter 78, thereby turning off the output driver circuit 83 until another start pulse is received from the timer circuit 50. This again causes the current limits comparator 80 to be inhibited momentarily to permit the output circuit to respond and rise above the clamped collector voltage, at which time the comparator is permitted to control the inverter 78 to prevent operation in saturation. To taper the current limit level of the current limit comparator in accordance with duty cycle, a slight ramp signal is superposed on the signal supplied by the output transistors 106 et seq to the comparator 80 by means of a connection between the high side of the capacitor 54 and the noninverting input to the comparator 80 through a resistor 124. Additionally, feedback from the output switching transistors is clamped to a voltage reference, for example five volts, through the resistor 118 and a diode 126 during the period the transistors are off.

Also helpful in understanding the present invention is the realization that considerable back EMF's will be generated by even short conductors in the output circuit disclosed herein, which may for example be on the order 18 kilowatts with a battery supply of 42 volts. Thus current switching rates must be on the order of 4–5 amperes per nanosecond. To avoid counter EMF difficulties, the transistors 106, 108 and 110 and associated collector diodes are all located in as close a proximity as possible, with interconnections therebetween being made from sheet copper to minimize voltage spikes. In addition, a large capacitor 128, for example 210 microfarads, is connected between the +and −terminals of the output stage and is used to contain the switching energy for third and higher harmonics at full power. The capacitor 128 may for example be comprised of a plurality of high "Q" capacitors, all of which are located in close proximity to the remaining components of the output circuit with similar interconnections.

In certain types of vehicles, such as hybrid vehicles in which the motive means is sometimes one or more electric motors and other times is another type of motor such as internal combustion, it is possible to operate the electric motors as generators with which to charge the battery supply. Thus, by reconnecting one motor terminal from the positive output to the negative output, the arrangement of the field coils is reversed and the motors then serve as generators to charge the battery supply through the diodes 112, 114 and 116. In this manner efficiency of the system is further maximized.

Having fully described one embodiment of the present invention, it is to be understood that numerous alternatives and equivalents which do not depart from the spirit of the present invention will be apparent to those skilled in the art given the teachings herein, and such alternatives and equivalents are intended to be included within the scope hereof.

What is claimed is:

1. Apparatus for generating a variable duty cycle pulse train comprising
   means adapted to receive a control signal,
   sawtooth generator means for supplying a sawtooth waveform,
   first amplifier means responsive to said control signal for establishing a reference voltage in accordance with the amplitude of said control signal, and
   open loop amplifier means responsive to said reference voltage and said sawtooth generator means for generating a train of pulses, the value of said reference voltage establishing the duty cycle of said pulse train, said open loop amplifier means including means for providing positive feedback of a substantially smaller amplitude than the amplitude of the output of said open loop amplifier means.

2. An improved variable pulsewidth inverter comprising:
first means adapted to be responsive to a control signal for generating a train of pulses, the pulsewidth of said pulses varying in accordance with the control signal, said pulsewidth defining a duty cycle of said pulses,
output means responsive to said train of pulses adapted for supplying power to a load according to said duty cycle, and
current limiting means responsive to the condition of said output means for controlling said output means to limit current through said output means in accordance with a predetermined current limit, said predetermined current limit tapering according to said duty cycle.

3. The variable pulsewidth inverter of claim 2 wherein said tapering occurs during each of said pulses.

4. The variable pulsewidth inverter of claim 3 wherein said current limiting means is further responsive to said first means for synchronizing said tapering with said pulses.

5. An improved variable pulsewidth inverter comprising:
first means adapted to be responsive to a control signal for generating a train of pulses, the pulsewidth of said pulses varying in accordance with the control signal, said pulsewidth defining a duty cycle of said pulses,
output means responsive to said train of pulses adapted for applying power to a load in accordance with said duty cycle, and
current limit means responsive to the condition of said output means, said condition indicative of current flowing through said output means, for controlling said output means to limit the current through said output means in accordance with a tapering predetermined current limit, said current limit tapering during each pulse of said train of pulses, said current limit means being responsive to said first means to synchronize said tapering of the current limit with each pulse of said train of pulses.

6. An improved variable pulsewidth inverter comprising:
first means adapted to be responsive to a control signal for generating a train of pulses, the pulsewidth of said pulses varying in accordance with the control signal, said pulsewidth defining a duty cycle of said pulses,
output means including at least one transistor having a collector, said output means being for controlling the conduction of said at least one transistor in response to said pulses, said at least one transistor being adapted to be connected to a load, and
current limiting means responsive to said collector for controlling said output means to limit current flow through said at least one transistor in response to a tapering current limit, said current limiting means being responsive to said first means for synchronizing said tapering current limit with each said pulse, the magnitude of said tapering for respective ones of said pulses varying in accordance with the pulsewidth of said respective ones of said pulses.

7. The improved variable pulsewidth inverter of claim 6 wherein said first means includes ramp generator means for generating a ramp signal having a rise time and a fall time substantially shorter than said rise time, and said current limiting means being responsive to at least a portion of said ramp signal to provide said tapering current limit.

8. An improved variable pulsewidth inverter as in claim 7 wherein said first means further includes comparator means for comparing said ramp signal with said control signal, said comparator means generating said train of pulses.

9. The improved variable pulsewidth inverter of claim 6 wherein said current limiting means is further for controlling said output means for preventing said at least one transistor from operating in saturation.

10. A method for limiting current flow in a variable pulsewidth inverter, comprising the steps of
generating a train of pulses in response to a control signal, the pulsewidth of said pulses varying in accordance with the control signal, said pulsewidth defining a duty cycle of said pulses,
supplying current to a load according to said duty cycle, and
limiting the current supplied to said load in accordance with a predetermined current limit, said predetermined current limit tapering according to said duty cycle.

11. The method as in claim 10 wherein said tapering occurs during each of said pulses.

12. The method of claim 11 wherein the current limiting step further includes sychronizing said tapering with each of said pulses.

13. A method for limiting current in a variable pulsewidth inverter comprising the steps of
generating a train of pulses, the pulsewidth of said pulses varying in accordance with a control signal, said pulsewidth defining a duty cycle of said pulses
applying current to a load in accordance with said duty cycle,
limiting current to said load in accordance with a tapering predetermined current limit, said current limit tapering during each pulse of said train of pulses, and
synchronizing said tapering predetermined current limit with each pulse of said train of pulses.

14. A method for limiting current flow in a variable pulsewidth inverter comprising the steps of
generating a train of pulses, the pulsewidth of said pulses varying in accordance with a control signal, said pulsewidth defining a duty cycle of said pulses,
controlling the conduction of at least one transistor in response to said pulses, said at least one transistor having a collector and being adapted to be connected to a load,
controlling said transistor to limit current flow through said at least one transistor in response to a tapering current limit, and
synchronizing said tapering current limit with each said pulse, the magnitude of said tapering for respective ones of said pulses varying in accordance with the pulsewidth of said respective ones of said pulses.

15. A method as in claim 14 wherein the method includes the additional steps of generating a ramp signal having a rise time and a fall time substantially shorter than said rise time, and tapering said current limit at least in response to a portion of said ramp signal.

16. A method as in claim 15 wherein said generating steps includes the additional step of comparing said ramp signal with said control signal and generating said train of pulses in response to said comparing step.

17. A method as in claim 14 including the additional step of controlling said at least one transistor for preventing said at least one transistor from operating in saturation.

* * * * *